Aug. 20, 1963     L. L. MARTIN     3,100,910
APPARATUS FOR THE EXPLOSION TREATMENT OF A PLASTIC CONTAINER
Filed April 10, 1958     3 Sheets-Sheet 1
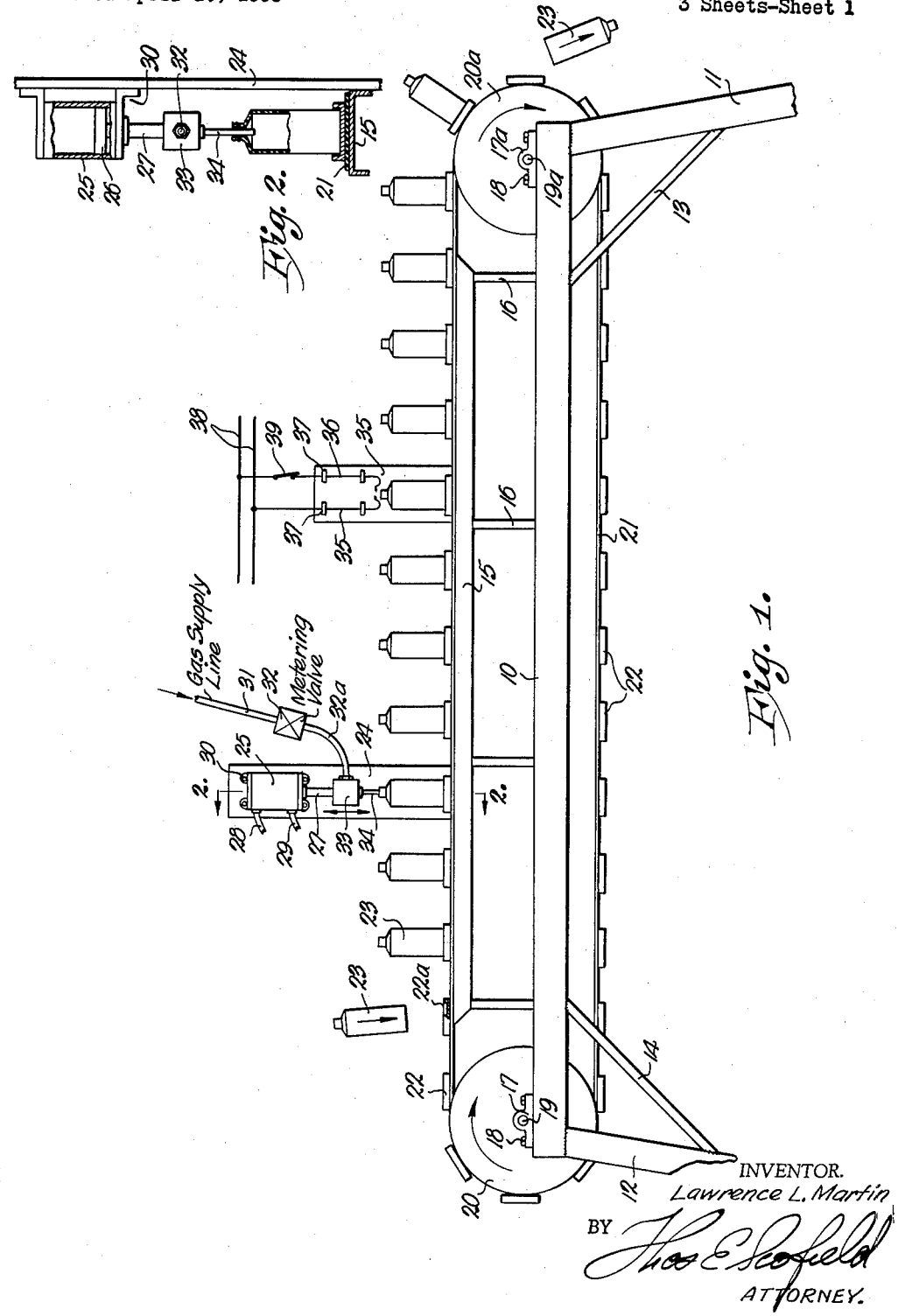
INVENTOR.
Lawrence L. Martin
BY
ATTORNEY.

INVENTOR.
Lawrence L. Martin
BY
ATTORNEY.

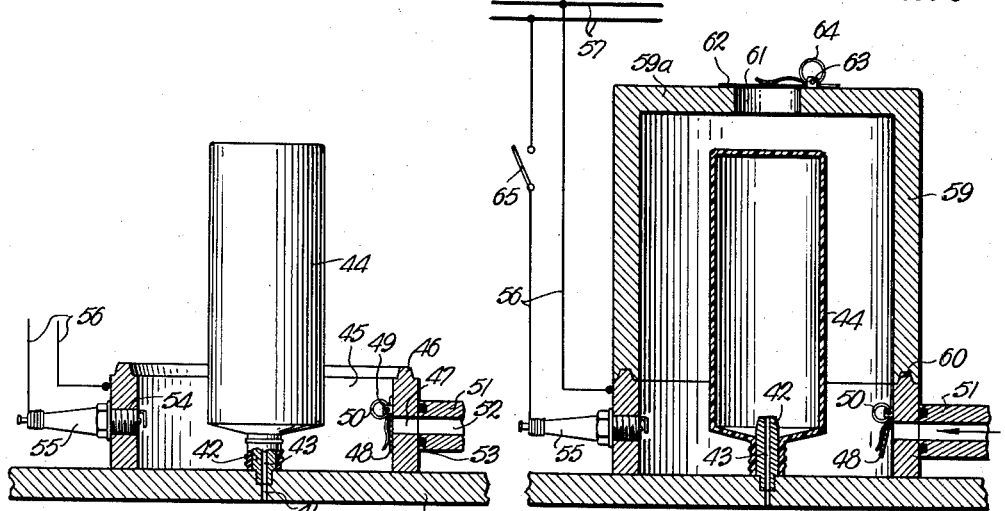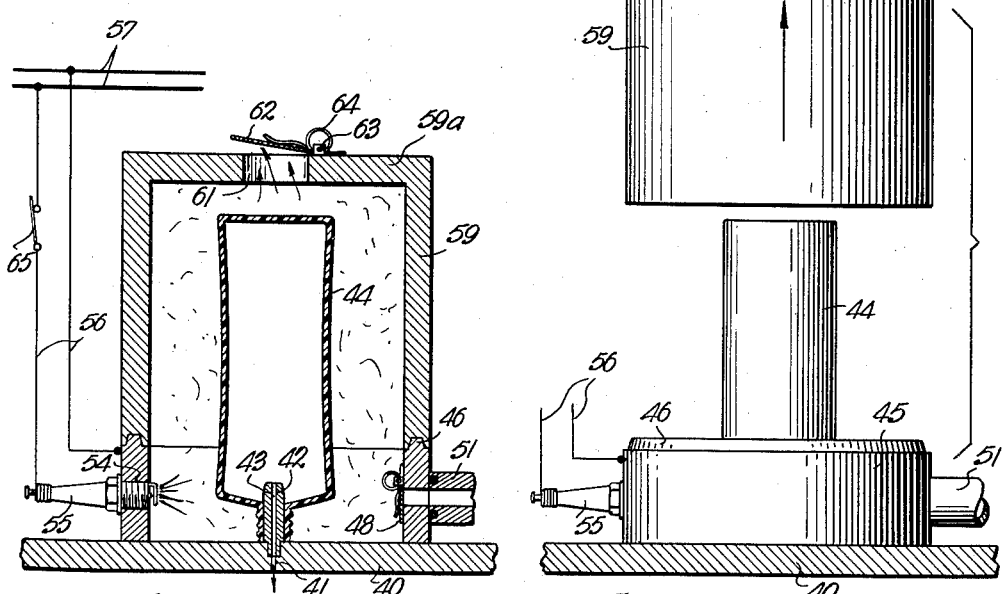

3,100,910
APPARATUS FOR THE EXPLOSION TREATMENT OF A PLASTIC CONTAINER
Lawrence L. Martin, Kansas City, Mo., assignor to Consolidated Thermoplastics Company, Stamford, Conn., a corporation of Delaware
Filed Apr. 10, 1958, Ser. No. 727,693
2 Claims. (Cl. 18—1)

This invention relates to apparatus for the treatment of polyethylene surfaces and refers more particularly to apparatus for the treatment of polyethylene surfaces to improve their "bonding properties" to prepare them for receiving surface indicia or coatings.

Polyethylene

U.S. Patent 2,153,553 discloses a solid polymer consisting of polymerized ethylene. Such polymer is known as "polyethylene" and an outstanding property thereof is its chemical inertness upon contact with inorganic acids and alkalies either in the cold or at 80° C.–90° C. Such polymer is also insoluble in many solvents, such as water, ethanol, amyl alcohol, ethyl ether, acetone, chloroform and glycerin. It is also incompatible with drying oils, such as linseed oil, or with nitrocellulose. This reference discloses what is currently known as high pressure low density polyethylene. Later processes have also produced low pressure high density polyethylene.

Polyethylene is a white, horn-like thermoplastic resinous material, the polymerization product of ethylene subjected to conditions of extremely high temperatures and high pressures. It is a tough, inherently flexible material resembling paraffin wax in appearance. Polyethylene resins are characterized by rather abrupt softening points, the resins generally changing from a solid to a rather soft plastic condition within a comparatively limited temperature range. The softening point of the polyethylene resins, and the degree to which softening of the resins occurs, varies, depending generally upon the average molecular weight of the said resins. Polyethylene resins are available commercially having available average molecular weights from at least approximately 8,000 to at least 19,000 and having softening points within the range of from approximately 140° F. to approximately 230° F.

Printing of Polyethylene

Major uses of polyethylene include applications in the form of sheeting or seamless tubing, as a wrapping or packaging material and in the form of blown containers. Such packaging and containers, in order to attain extensive and widespread use, must be so produced that trademarks, advertising materials, directions, recipes, etc., can be imprinted thereon by conventional printing processes utilizing conventional printing inks. The dried ink impressions must firmly adhere to the polyethylene surfaces and effectively resist removal upon abrasion or other treatment to which the printed surface will be subjected during its life. Such life includes the time from its printing until it reaches the consumer and also the period of its use by the consumer.

Because of its paraffin-like surface properties and other properties, untreated polyethylene in the form of film, wrapping, and containers cannot be satisfactorily printed with inks of the oil or lacquer types normally used for printing non-fibrous, cellulosic materials. If untreated polyethylene of any type is so printed, dried ink impressions do not adhere firmly to the polyethylene surface. Slight abrasion, such as gentle scrapings with the back of the fingernail, will remove the dried ink impressions with very little effort. Also, when such polyethylene is stretched or compressed, the ink may crack and fall off. Generally, untreated printed polyethylene also cannot pass the "Scotch tape" test, a test well known in the art to indicate the degree of adherence of printing ink to surfaces.

A number of patents have issued in the United States on various means and methods of treating polyethylene to prepare the surface thereof for the proper receipt of conventional printing inks. These include Patent No. 2,502,841 to Henderson, issued April 4, 1950; the patent to Kreidl, No. 2,632,921, issued March 31, 1953; the patent to Horton, No. 2,668,134, issued February 2, 1954; the patent to Kritchever, No. 2,648,097, issued August 11, 1953; and three patents to Wolinski, Nos. 2,715,075, 2,715,076 and 2,715,077, all issued August 9, 1955. Henderson teaches treating the surface of polyethylene by superficially chlorinating it. Horton discloses exposing polyethylene to a saturated solution of sodium dichromate in concentrated sulfuric acid. Kreidl discloses softening the surface of polyethylene by application of heat thereto. Kritchever discloses passing a polyethylene surface through a flame to immerse the surface within the flame to soften it. Wolinski discloses various chemical treatments of polyethylene film including the use of ozone and halogens, ozone and nitrous oxide and nitrous oxide alone.

Some of these above listed processes are objectionable because of excessive expense, some because of adaptability only to the treatment of polyethylene films, some because they require excessive time, and finally, some because they involve the use of noxious substances or substances which include an element of danger to the operator of the process.

Polyethylene Permeation

Another characteristic of polyethylene which is objectionable insofar as packaging and containers is concerned, lies in the fact that certain chemical substances, particularly organic chemicals such as the essential oils, will bleed more or less swiftly through a polyethylene film or container wall. The more rigid polyethylenes bleed less swiftly than the more flexible varieties. In such circumstances, it is desirable that a coating be supplied on the inside or one side of the film or container wall whereby to resist such permeation or bleeding. A number of liquid plastics such as, and including, saran (vinylidene chloride) and other like compounds have proved suitable for such coatings in various applications. However, such known coatings will not readily adhere to a polyethylene surface unless it has been treated in some manner to render the surface more receptive to such a film. While such treatment may be feasible employing liquids such as acids or corrosive gases wherein the entire interior of a container or the surface of a film may be uniformly and completely exposed to the liquid or gas, such arrangements are expensive, involve the use of noxious, dangerous substances, and create a time problem and the associated problem of cleaning the container or film after treatment. Flaming a bottle or container on the inside thereof is likewise extremely difficult as the oxygen within a container is quickly exhausted and the flame likely to go out before adequate treatment is provided.

An object of the invention is to provide apparatus for modifying the surface of a polyethylene structure so that dried ink impressions of printing inks normally used for printing cellulosic objects or films and of either the oil or lacquer types will firmly adhere thereto and resist abrasion and other usual treatments to which the structure may be subjected during its life.

Another object of the invention is to provide improved apparatus for improving the bonding properties of the surfaces of polyethylene resins.

Another object of the invention is to provide apparatus for treating polyethylene surfaces, including the interiors of polyethylene containers, whereby to adequately prepare such surfaces and interiors for the receipt of an antipermeation film of various types.

Yet another object of the invention is to provide apparatus for treating polyethylene films and containers on the external surfaces thereof whereby to prepare them to receive silk screen printing, inks and indicia of various sorts which will pass the "Scotch tape" test.

Another object of the invention is to provide apparatus for treating alternatively, simultaneously, or sequentially, the external and internal surfaces of a polyethylene container to prepare the external surface for silk screen printing or the like and the internal surface for the receipt of an antipermeation film or layer.

Other and further objects of the invention will appear in the course of the following description thereof.

In the drawings, which form a part of the instant invention and are to be read in conjunction therewith, embodiments of the inventive apparatus are shown and, in the various views, like numerals are employed to indicate like parts.

FIG. 1 is a side, partly-schematic view of inventive apparatus being particularly adapted to the internal treatment of containers for receipt of antipermiation layers or films.

FIG. 2 is a view taken along the lines 2—2 of FIG. 1 in the direction of the arrows.

FIG. 3–6, inclusive, show four stages of a modification of the inventive apparatus in which the exterior surface of a container is treated for the receipt of printing ink and the interior surface of the same container is simultaneously treated for receipt of an antipermeation film.

Figure 3:
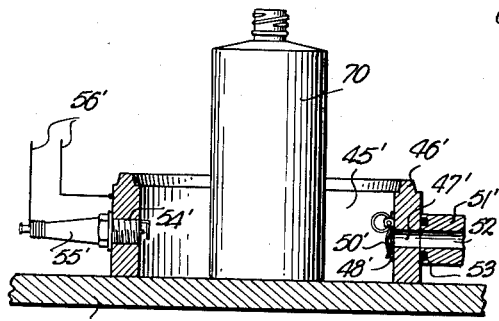

FIG. 3 shows a container being positioned in the lower portion of the treating apparatus.

Figure 4:
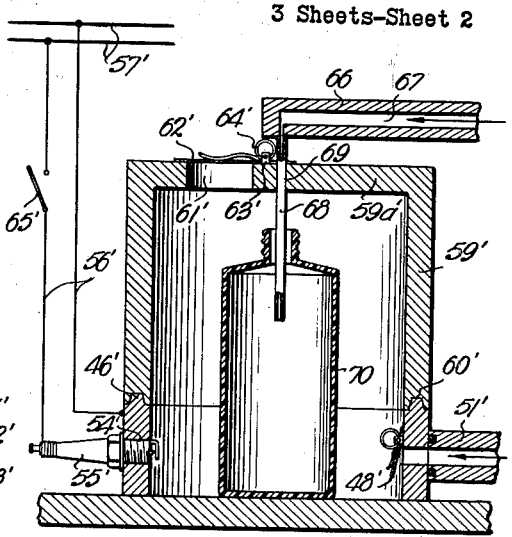

FIG. 4 shows the treating apparatus completely assembled and explosive mixtures being passed into the space around the container and the interior of the container.

Figure 5:
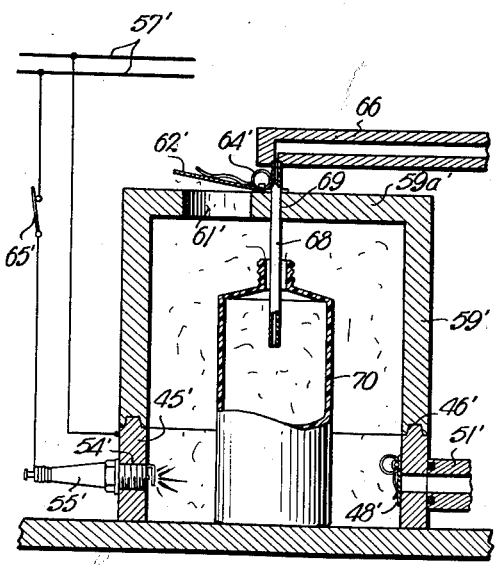

FIG. 5 shows the step of detonating the explosive mixtures both in and around the container.

Figure 6:
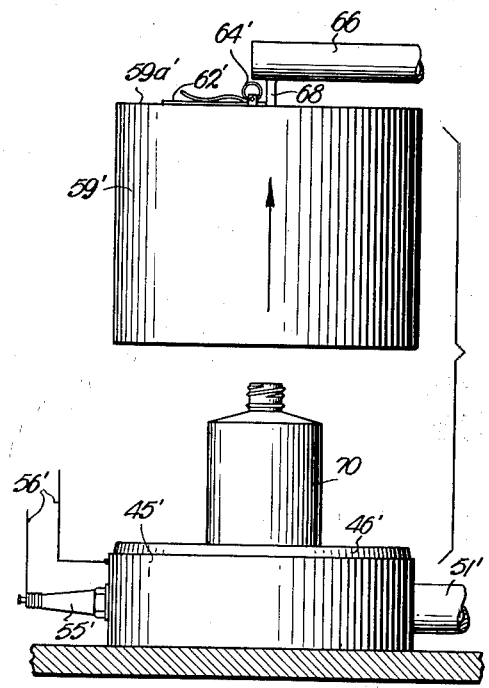

FIG. 6 shows the withdrawal of the upper portion of the treating apparatus from the treated container.

FIGS. 7–10, inclusive, show apparatus in which only the exterior of a polyethylene container is treated for the receipt of printing ink or the like.

FIG. 7 shows a container positioned within the lower portion of the inventive treating apparatus.

FIG. 8 shows the inventive treating apparatus assembled and an explosive gas mixture being inserted in the space surrounding the container to be treated.

FIG. 9 shows the detonation of the explosive mixture around the container being treated.

FIG. 10 shows the withdrawal of the upper portion of the treating apparatus from the container previously treated.

*Internal Container Treatment*

The modification of the invention shown in FIGS. 1 and 2, wherein the interior surface of the container is treated for receipt of an antipermeation film, will be first described.

Horizontal frame member 10 is supported at its ends by legs 11 and 12 and braced against the legs by members 13 and 14. Upper member 15 is spaced from member 10 by vertical members 16. Conventional journal bearings 17 and 17a are bolted to member 10 by bolts 18 and receive one end of shafts 19 and 19a. Sheaves or pulleys 20 and 20a are mounted on shafts 19 and 19a respectively, which are received at their other ends in like bearings 17 and 17a (not shown) on a like member 10 (not shown) on the other side of the pulleys 20 and 20a. Pulleys 20 and 20a are driven in rotation by suitable conventional driving means coupled therewith (not shown).

Conveyor belt 21 has a plurality of container receiving mounts 22 attached thereto, is carried by the pulleys 20 and forms a continuous conveyor means relative member 10. Mountings 22 have hollow portions 22a centrally thereof to receive in friction fit the bottoms of containers 23 which are to be internally treated.

Containers 23 are individually positioned in mountings 22 by hand or suitable mechanical means (not shown) whereby a continuous stream of containers to be treated is carried along the conveyor belt 21 from the left to the right in FIG. 1 where, after treatment to be described, the treated containers fall from the mountings 22 into any suitable conveyor means to a further process position (not shown) or suitable receptacles of a conventional type (not shown). While the containers 23 may be removed from the mountings 22 by hand at the right side of FIG. 1, preferably, the frictional engagement between the containers and the mountings 22 is sufficiently small that the containers will fall out under gravitational force.

Support or beam 24 is vertically positioned alongside member 15 and may be attached thereto. Hydraulic cylinder 25 of conventional type having piston 26 therein attached to piston rod 27, is driven in up and down motion by suitable hydraulic fluid input through lines 28 and 29, actuated by suitable conventional control means (not shown). Cylinder 25 is fixed to beam 24 by bolts or screws 30. Gas supply line 31 has conventional metering valve 32 intermediate the length thereof and leads from a supply of gas or gases (not shown) such as a tank or the like. Union 33 connects piston rod 27, gas supply line 31, which is preferably of flexible material such as rubber or the like, and rigid feed tube 34 extending vertically downward from union 33. A passage (not shown) is provided through the junction or union 33 from the input of line 32 to the output connection of tube 34. The length of feed tube 34, piston rod 27 and the height of cylinder 25 on backing 24 must be regulated relative the height of the bottles being treated so that the feed tube 34 only penetrates the interior of the container or bottle a desired distance. Additionally, piston rod 27 must lift the free end of tube 34 above the bottles being treated as they move along the conveyor belt. The control of motion of the conveyor belt 21 must be such as to intermittently stop the belt when each container is positioned before cylinder 25.

Support or beam 35, which may be attached to member 15, if desired, carries electrical leads 35 and 36 which are positioned thereon by clips 37. Leads 35 and 36 are connected to any conventional source of electrical power 38 whereby closure of switch 39 will give a spark discharge across the ends of the leads 35 and 36 immediately above the top of a container 23 which has been charged with an explosive mixture of gases from tube 34. Supports 24 and 35 must be so spaced relative one another that the tube 34 and the ends of the leads 35 and 36 will be positioned above the openings of the containers 23 at each intermittent stop of the belt 21.

In operation of the modification of the apparatus shown in FIG. 1, the containers 23 are intermittently moved along the conveyor belt 21 to sequentially space each one under the tube 34 and the ends of the electrical leads 35 and 36. At the station in front of beam 24, suitable hydraulic actuation of cylinder 25 lowers tube 34 into the container a desired distance as is shown in FIG. 2 and suitably timed release of the metering valve 32 discharges into the container a gas or gases which, either alone or in combination with the air within the container forms an explosive mixture which, when detonated in the container will improve the bonding properties of the internal surface of the container without damaging or rupturing the container.

Acetylene is a preferred gas used. Karrer, P. in his "Organic Chemistry" published 1938 by "Elsevier" and Nordeman Publishing Company, Inc., of New York states, "Acetylene burns with a strongly luminous and sooty flame. Mixtures of the hydrocarbon with air are exceedingly explosive, and the limits of composition of the explosive mixtures are wide, only those mixtures containing less than 5% or greater than 80% of acetylene being not explosive. Mixtures of the hydrocarbon with oxygen, are of course, correspondingly more dangerous." Whitmore, Frank C., in his "Organic Chemistry," published in 1937 by Van Nostrand Company, Inc., New York, states, "Acetylene forms explosive mixtures with air over the wide limits from 3 to 82% acetylene. This behavior is unusual." While I have not been able to determine the precise percentage limits of an acetylene-air or acetylene-oxygen mixture for the explosive treatment of polyethylene surfaces, there is no doubt that both acetylene-air and acetylene-oxygen mixtures may vary in a wide ratio to give a workable "explosive" mixture. My experience has been that the explosion must be in contact with the surface to be treated, it must not be a combustion with a production of flame and soot and must improve the bonding properties of the polyethylene. It is very easy to distinguish between combustion of acetylene in both air and oxygen and explosion thereof. The explosion causes a white, small duration flash which is clean, odorless, and does not sensibly heat the surface which is treated. On the other hand, a combustion is relatively slow, has a colored luminous flame and produces a fall out of soot on the surface next the flame. Such combustion fall out of soot or carbonaceous material makes subsequent application of antipermeation films impossible. I have found that it is very difficult, if not impossible, to create an acetylene-air mixture by injection of pure acetylene into the air of the bottle which will damage a conventional polyethylene container or bottle. The size of the neck opening of the bottle is a factor somewhat, however. On the other hand, I have been able to establish acetylene-oxygen mixtures which will treat the internal surface of the container as desired but will rupture the container upon detonation. Thus, the acetylene-pure oxygen mixtures have potentially greater explosive force and have a narrower range of operability than the acetylene-air combination. While adequate technics may be developed for removal of soot or carbonaceous material fall out on the internal surfaces of the container, at present, the difficulty of access to this layer, its oily-seeming adherence to the surface of the polyethylene and the time and expense of removing it appear to be prohibitive to a commercial operation.

If acetylene is discharged into the container air by itself, the resultant ratio of acetylene to air must be explosive. If a mixture of acetylene and oxygen is discharged into the container, this mixture must be explosive as discharged into the air already contained within the container. If the mixture as contained in the container when it reaches the station in front of beam 35 is not explosive but merely combustible, the resultant flame and soot fall out will contaminate the inside of the bottle and not treat it properly. If, on the other hand, it is explosive, the treatment will be clean and effective for the antipermeation treatment. If acetylene and oxygen are employed, the mixture must not be of such an explosive ratio as to exert sufficient force to destroy or damage the container itself.

As the bottles, after input of the explosive gas mixture, pass under the free ends of the leads 35 and 36, properly timed closing of the switch 39 causes a spark which detonates the mixture therein. The time of travel from station in front of beam 24 to station in front of beam 35 has been found not to be of particular criticality. That is, the critical ratio once established in the bottle is not readily lost. However, too long a delay between the two stations may cause loss of criticality of the mixture, particularly if the mixture, as established in the bottle originally was close to either the range of nonexplosive and noncombustible mixture or a combustible rather than an explosive mixture. Therefore, for any given ratio of gases in the bottle, the time between the two stations must be adjusted so an explosion will always result at station 35 to avoid repeated treatment necessities or failure of antipermeation subsequent treatment.

*External Container Treatment*

The modification of the inventive apparatus shown in FIGS. 7–10, adapted for the external treatment of a container to prepare it for printing by silk screen process or other conventional printing process, will now be described.

Base 40 having opening 41 extending upwardly therethrough also mounts plug 42 having passage or opening 43 extending therethrough and connecting with passage 41. The outside diameter of plug 42 is preferably substantially equal to the inside diameter of the neck of a container 44 to be treated whereby the container may be fitted down over the plug 42 to fix it in position for the treatment process. Circumferential wall 45, preferably cylindrical in plan view, has upper flange 46 and is fixedly attached, preferably at its lower edge, to base 40. A passage 47 extends through one wall thereof and is closed on the inside by door 48 which is pivotally mounted by clip 49 on wall 45. Spring 50 tends to close door 48 but permits resilient opening thereof under sufficient external pressure. Feed tube 51 has passage 52 therein to join passage 47 in wall 45. O-ring 53 aids in sealing the end of tube 51 to the wall 45 circumferential to passage 47. Tube 51 may be attached to the wall 45 if the construction is to be stationary, but, on the other hand, if a plurality of enclosure units are to be mounted on a rotating table to be fed explosive mixture through a single tube 51, the modification shown is preferred. A second threaded passage 54 receives conventional igniting or detonating means 55, in this case a conventional spark plug. Electrical leads 56 furnish suitable current to cause a spark between the electrodes of the spark plug within the wall 45. Leads 56 are connected to any suitable conventional source of electrical power 57 (FIG. 8). Upper wall portion 59, having groove 60 in its lower edge to receive flange 46, fits down over and engages with wall 45 to form an enclosure. Passageway 61 in the top 59a of wall 59 is closed normally by door 62 which is pivotally mounted by clip 63 on the top 59a. Spring 64 tends to maintain door 62 in closed position except under sufficient internal pressure within the enclosure.

The successive steps of operation of the apparatus illustrated by FIGS. 7–10, inclusive, will be described relative to these figures in sequence. With the top enclosure 59 spaced sufficiently far away from the lower wall portion 45 by motion either of the base 40 carrying wall 45 or the upper enclosure 59, container 44 may be fitted down over peg or mounting 42. Immediately, then, the enclosure 59 may be closed over the container as mounted and flange 46 fitted into groove 60 to form a sealing fit. Any conventional sort of locking means (not shown) may be employed to join walls 45 and 59.

Once the enclosure around the container is assembled, a suitable mixture of explosive gases or gas to combine with the air in the chamber surrounding the container to make such a mixture is input through passage 52. The external pressure causes door 48 to open. Depending upon the quantity and type of gas used, sufficient gas may be input to the chamber to cause some venting out of door 62, although this is not shown in FIG. 8. Alternatively, insufficient gas may be input to the chamber to cause such venting and merely a slight rise in pressure may be created within the container. Such rise of pressure tends somewhat to flex inwardly the walls of the container thus exhausting the air therein out through the passages 43 and 41.

Once the explosive mixture has been established within the chamber, there is no particular requirement of speed in detonating the mixture, this being estimated solely by the rate of treatment desired by the operator. FIG. 9 shows the detonation of the explosive mixture around the container by sparking of plug 55 by closing of switch 65. It should be understood that any operable means of causing the detonation of the mixture may be employed, such as hot wire, a flame, concussion or the like, depending upon the nature of the gases employed for the explosive mixture. However the detonation is caused, the uniform explosion of the mixture in the chamber treats the outside surface of the container. Venting is accomplished through door 62 as shown in FIG. 9. Door 48 does not vent under internal pressure within the chamber. Air or other gas within the container may be expelled through the openings 43 and 41 as the walls of the container flex under the pressure, if such takes place, and then air may be returned through the same passages as the container walls return to their original position. The necessity of venting the interior of the container lies mainly in the desirability of maintaining the container on the post or pin 42 as otherwise, the container might pop off such a mounting and come free within the chamber As to the nature of the explosion within the chamber, it should be noted that it is not absolutely necessary to have a completely closed chamber, depending upon the time delay before detonating. This is the same factor operative in the process of FIG. 1 where the top of the gas injected container remains open. Remarks as to the useable gas mixtures and the like relative FIG. 1 apply in this modification of the process and will not be repeated in full detail here. However, the chamber as shown here with means for venting both the container being treated and the chamber itself may permit greater explosive force applied to the container itself without damage than may be experienced in the internal treating process of FIG. 1. This, again, is relative but the explosive ranges particularly of acetylene-oxygen mixtures may not be quite as critical in this modification of the process.

Combustion soot or carbonaceous material fall out on the outside surface of the container due to combustion in the chamber rather than explosion is as objectionable as in the internal treatment. Printing is impossible without cleaning off such carbonaceous material.

FIG. 10 shows the removal of the housing portion 59 from the wall portion 45 to permit manual or other removal of the container after treatment. It should be noted relative both the process of FIGS. 1 and 2 and the process of FIGS. 7-10 that successive treatments may be given to the same bottle, either interiorly or exteriorly by furnishing two or more additional stations with a longer conveyor system as in FIG. 1 or merely recharging the chamber with explosive mixture after one treatment in the modification of FIGS. 7-10. However, I have found that multiple treatments are not necessary to adequately prepare a container for conventional silk screen printing processes on the outside or adherence of antipermeation films on the inside. Variation in types of ink or in types of coating films may change this requirement somewhat, but it is not now presently anticipated.

Relative the process of FIGS. 7-10, it should be emphasized that the use of combustible rather than explosive mixtures in this modification of the method is as objectionable as in the case of the interior treating process of FIGS. 1 and 2. As stated previously, the use of acetylene and oxygen or acetylene and air in a combustible rather than an explosive mixture will result in a fall out of soot on the outer surface of the bottle which must be removed in some manner before adequate printing can be achieved. The soot fall out gives an oily visible coating to the outside surface of the container. While it may be relatively easier to clean off this film of soot from the outside of the bottle than the inside, nevertheless, it is highly undesirable and makes for a commercially nonworkable process without additional time and expense, as well as the use of various cleaning agents which may have an element of noxiousness or danger to the operator. Such soot may also coat the inside walls of the chamber.

An additional objection to the use of a combustible mixture of gases in the chamber or in the container as in the showing of FIGS. 1 and 2 lies in the fact that a combustible mixture burns for a relatively long period and heats the container surface. This is undesirable as there must be a further cooling process after such heating. It is also questionable whether the use of combustible mixtures of gases rather than explosive mixtures will treat the interior and exterior of the bottle satisfactorily to improve their bonding properties. My experience has been that the soot fall out so befouls the interior and/or exterior of the container as to preclude even testing the surface due to the nature of the cleaning required. The carbonaceous soot fall out in the case of the use of a combustible mixture of acetylene and air, for example, is very difficult to remove, very tenaciously adheres to the surface of polyethylene and appears oily and dark. An explosive mixture, on the other hand, neither detectably heats the container nor causes any sort of a soot or carbonaceous fall out on the surface, interior or exterior, of the container. Thus the container is ready for immediate application of the protective coating and/or printing. Immediate manual contact with an explosion treated container, either interior, exterior, or both, does not disclose any heating effect whatsoever. Additionally, the explosion treatment process of either the interior or the exterior of the container or both simultaneously does not change the appearance of the polyethylene to any noticeable degree. Thus, there is no glossing, softening or melting as in the case of heating or application of a flame.

The physical and/or chemical effects of a gas mixture explosion on the surface of a container, interior or exterior, has not been completely determined. However, the characteristics which are observable have been described above. The statement that the appearance of the container is not changed by the explosion treatment must, of course, be taken in view of the fact that certain explosive mixtures can be employed within the bottle which will destroy or damage the container, which does itself change the appearance of the total bottle. Likewise, such explosive force can be applied to the exterior of the container as in the process of FIGS. 7-10 which may slightly deform the shape of the container. These effects are gross and obvious and are destructive ones, rather than effects created by the treating process in improving surface bonding properties which I regard as my invention.

*Simultaneous Internal and External Container Treatment*

The showings of FIGS. 3-6, inclusive, which illustrate apparatus for the simultaneous treatment of the interior and exterior of a container will now be described.

The construction of the detonation chamber of FIGS. 3-6, inclusive, is identical with the construction shown in FIGS. 7-10, inclusive, with the exception of the addition of means for adding an explosive gas mixture to the interior of a container to be treated. Therefore, parts which are identical in structure with those of the showings of FIGS. 7-10, inclusive, are numbered alike (but primed) and will not be redescribed. Another difference in the showings of the two sets of figures lies in the fact that there is no equivalent structure to the mounting 42 of FIGS. 7-10 in FIGS. 3-6. Thus the base 40' has no opening whatsoever therethrough. Gas or gaseous mixtures supplied to tube 66 having flow passage 67 passes to interior feed tube 68 which extends through an opening 69 in the upper portion of enclosure 59'.

In operation of the modification of the invention shown in FIGS. 3-6, inclusive, a container 70 to be simultaneously treated both internally and externally to receive a protective coating inside and printing on the outside, is placed within the enclosure wall 45', preferably substantially centrally thereof, with its lower end resting on the upper surface of base 40'. The container must be open at its upper end or wherever its normal opening is. The upper enclosure wall 59a' which carries tube 68 with attached supply tube 66 may then be lowered into place or, at any rate, fitted onto flange 60' of wall 45', thus providing a sealed chamber.

An explosive mixture of gases or a gas which in combination with the air within the chamber makes an explosive mixture is then flowed in through passages 52' and 47' surrounding the container, while a like mixture of gases or gas is flowed into the interior of the bottle to provide an explosive mixture therein. During these flows, air is displaced from the interior of the container 70 and the pressure thus tends to rise within the enclosure 59', as well as from the input of gas from tube 51'. Venting may take place at door 62', although this is not shown in FIG. 4. Once the explosive mixtures have been established within the chamber and pressure equilibrium reached therein, any time delay desired may be taken before detonation of the two explosive mixtures by plug 55' or other conventional detonating means as set forth relative the exterior treating process of FIGS. 7–10. If the chamber is not sealed as shown, the limiting time may be shorter.

The detonation outside the bottle touches off the explosive mixture within the bottle. Venting takes place at door 62' and not at door 48'. Repeated treatments of both inside and outside of the container or merely the outside may take place within the chamber without opening it, provided explosive mixtures are reestablished, but, my experience has conclusively proved that sufficient and adequate treatment of both the inside and the outside of the container may be achieved with one explosion treatment for both application of conventional printing inks and protective coatings. It should be pointed out that there is a double hazard of bottle contamination due to mere combustion of the gases rather than explosion thereof and it is possible to have a soot fall out either within or without the bottle or both within and without the bottle, thus almost hopelessly contaminating the surfaces of the bottle and preventing either protective coating addition and/or printing on the outside of the bottle. However, on the other hand, I have discovered that with acetylene and air or acetylene and oxygen, the ratios may be easily controlled so as not to either jeopardize the chamber itself, the container or the surfaces of the container. The simultaneous internal and external container treatment like the separate treatments have proved adaptable to mass production, as well. Once the bottle has been treated one or more times, as desired, the wall segments 59' and 45' may be separated by vertical movement of either and the treated container removed to be replaced by another.

The remarks about the critical natures of the explosive gas mixtures made previously relative the other two modifications apply in the combined treatment, as well, and will not be fully repeated here.

A typical material employable for the internal coating and internal protection of a polyethylene container is saran (vinylidene chloride). After internal treatment of the bottle by the explosion method herein disclosed, saran or a like compound may be poured into the bottle, the bottle then inverted to remove the liquid coating material and then permitted to dry or heated to facilitate drying of the coating on the interior of the bottle. While various internal coating materials will protect against varying substances to be contained in the bottle, my process may be used to prepare the bottle for the receipt of several types of such coatings, however applied.

From the foregoing it will be seen that this invention is one well adapted to attain all of the ends and objects hereinabove set forth, together with other advantages which are obvious and which are inherent to the method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter hereinabove set forth or shown in the accompanying drawings is to be interpreted as illustrative and not in a limiting sense.

Having thus described my invention, I claim:

1. Apparatus for the simultaneous explosion treatment of the internal and external surfaces of a container comprising means for at least partly and relatively closely confining the exterior surface of the container, means for providing an explosive acetylene containing mixture of gases in the container, means for providing an explosive mixture of gases in the confining means external of the container and means for detonating at least one of said explosive mixtures.

2. Apparatus for the explosion treatment of the external surface of a container comprising means for providing and maintaining at least for a limited period of time an explosive acetylene containing mixture of gases in contact with the external surface of the container to be treated, said means relatively closely confining the external surface of the container and means for detonating said explosive mixture of gases in contact with the external surface of the container.

References Cited in the file of this patent

UNITED STATES PATENTS

| | | |
|---|---|---|
| 2,354,218 | Murray | July 25, 1944 |
| 2,795,820 | Grow et al. | June 18, 1957 |
| 2,801,446 | Wolinski | Aug. 6, 1957 |
| 2,810,933 | Pierce et al. | Oct. 29, 1957 |
| 2,892,733 | Gardner et al. | June 30, 1959 |